J. F. MUNZ.
Harrow.
No. 224,601. Patented Feb. 17, 1880.
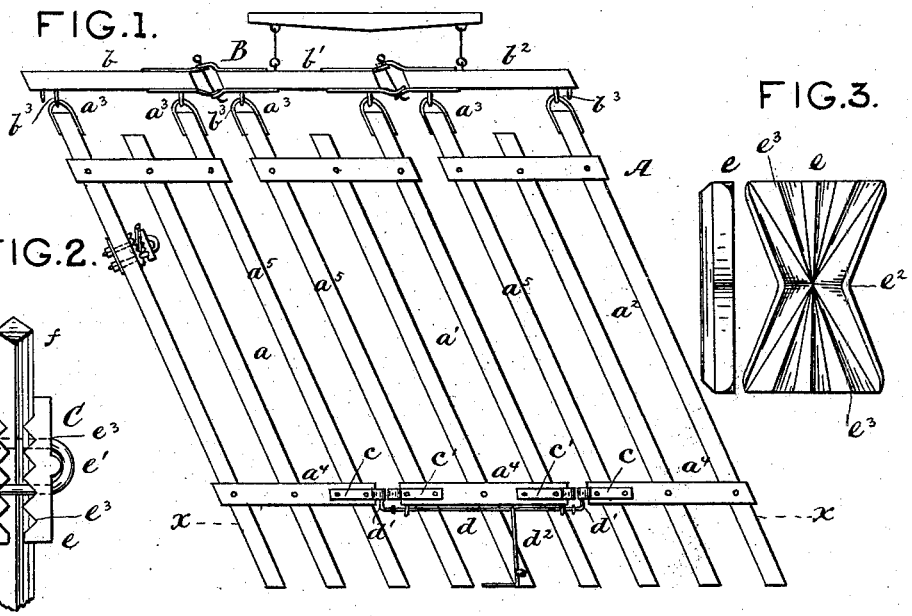
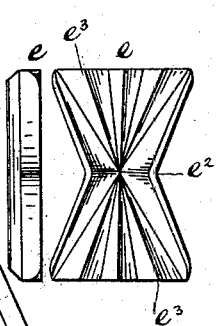
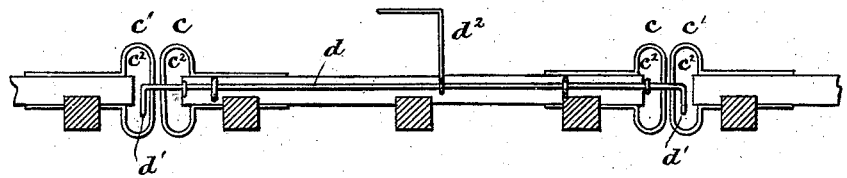
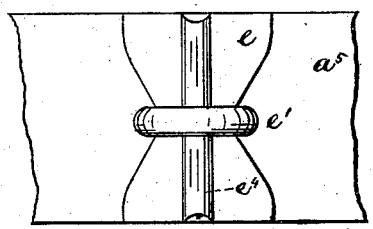
Witnesses:
Sam¹ R. Turner
J. B. Holderly
Inventor:
Jokob F. Munz
By R. S. & A. P. Lacey Attys.

UNITED STATES PATENT OFFICE.

JAKOB F. MUNZ, OF DELAWARE, OHIO.

HARROW.

SPECIFICATION forming part of Letters Patent No. 224,601, dated February 17, 1880.

Application filed December 31, 1879.

*To all whom it may concern:*

Be it known that I, JAKOB FRIEDRICH MUNZ, of Delaware, in the county of Delaware and State of Ohio, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to furnish a harrow made in sections and secured together with capability of separate vertical movements, and has a further object to provide a substantial tooth-fastening.

I will first describe my invention, and then specifically point it out in the claims.

In the drawings, Figure 1 is a plan of my harrow, and Fig. 4 is a cross-section on line $x\ x$, Fig. 1; and Figs. 2, 3, and 5 are detail views of the harrow-tooth fastening.

A is the harrow, made in sections $a\ a'\ a^2$. B is the draft-bar, which is made in sections $b\ b'\ b^2$, each having a length corresponding to the width of the sections $a\ a'\ a^2$, as shown, and they are hinged together, so that they will fold up when the said sections are folded. To the draft-bar B, I affix suitable devices to which the whiffletrees may be attached.

On the forward end of the sections $a\ a'\ a^2$, I affix rings or clevises $a^3$, which connect loosely with rings or staples $b^3$ on the draft-bar B. This mode of attachment permits a free and unlimited vertical movement of the rear end of each section of the harrow.

On the abutting ends of the cross-framing bars $a^4$, on the rear ends of the sections $a\ a'\ a^2$, I place the bumpers $c\ c'$, which are so arranged that when brought together, as shown in Figs. 1 and 4, the longitudinal bars $a^5$ of the section of the harrow will be parallel. These bumpers are formed with vertical slots $c^2$, which receive the ends of the hooks of fastenings hereinafter described.

$d$ is a rotating bar fixed to the center section, $a'$, and provided with hooks $d'\ d'$ on its ends, and so arranged that said hooks may be readily turned into the slots $c^2$ of the bumpers $c'$, and thus couple all the sections together.

The bar $d$ may be made in two parts, each capable of being turned independently of the other, so that one of the outer sections of the harrow may be coupled to the central section, while the other outer section is left free to swing laterally on its rings $a^3$. The rod $d$ is operated by a suitable lever, $d^2$. The rear ends of the sections $a\ a'\ a^2$ each have a distinct but limited vertical movement when secured by the rod $d$, which permits the harrow to adapt itself to a slight unevenness in the surface of the ground.

C is the tooth-fastener, which is composed of the two plates $e\ e$ and the staple-bolt $e'$. The plates $e$ are alike in form, and the tooth is placed between them, and they are clamped together and held to the side of the bars $a^5$ by the staple-bolt $e'$, as shown in Figs. 2 and 5. The plates $e$ have their edges cut away from the ends inward, so that they converge to a central point, $e^2$, giving to them the double dovetail form shown. The staple-bolt $e'$ passes over the plates at the narrow central point, $e^2$. The plates are thus held from sliding vertically when fixed to the bars $a^5$, or from dropping out when the bolt $e'$ is loosened for the purpose of adjusting the tooth $f$.

The plates $e$ have formed on their inner faces the series of converging grooves $e^3$, formed from the opposite ends to the central point or line, $e^2$.

The channels of both plates are similar in form, and are so arranged that they coincide when said plates are brought together face to face and form channels in which the tooth $f$ is placed. By having the grooves converging to the center $e^2$ it will be seen that the tooth $f$ may be set in a vertical position or to incline forward or back, as may be desired.

On the back of each plate $e$ there is formed a vertical rib, $e^4$, which extends its whole length. The rib on one of the plates is let into the side of the rail $a^5$, while the rib of the other plate fits into the arch of the staple-bolt, as shown in Fig. 2.

The bar B, affixed on the front ends of the sections $a\ a'\ a^2$, will fold up with said sections when desired. The bar B may also be turned up over the ends of the bars $a^5$ and the hitching devices fixed to the side thereof. In this position the rear ends of the sections $a\ a'\ a^2$ may be turned laterally, and thus adapt the harrow for use in planting small seeds where a light disturbance of the surface is desired. The end section of the bar B will bend forward to permit the spreading of the rear ends of the sections of the harrow.

Having thus described my invention, what I claim, and desire to secure by Letters Patent, is—

1. The combination, with the sections $a\ a'\ a^2$, provided with the slotted bumpers $c$, of the rotating rod $d$, fixed to the central section, $a'$, and having hooks $d'$, arranged to operate as and for the purposes set forth.

2. In a harrow, the tooth-fastener C, composed of the plates $e\ e$, having their edges beveled inward to form a narrow central waist, $e^2$, and having a series of converging grooves or channels, $e^3$, formed in their inner faces and uniting on a common center or the central line, $e^2$, and the staple-bolt $e'$, substantially as and for the purposes set forth.

In testimony that I claim the foregoing I have hereunto set my hand this 3d day of December, 1879.

JAKOB FRIEDRICH MUNZ.

Witnesses:
J. S. GILL,
R. R. HENDERSON.